United States Patent
Sperling et al.

(10) Patent No.: US 9,495,459 B2
(45) Date of Patent: *Nov. 15, 2016

(54) OPTIMIZING WEB CRAWLING THROUGH WEB PAGE PRUNING

(71) Applicant: International Business Machines Corporation, Armonk, NY (US)

(72) Inventors: Shahar Sperling, Tel-Mond (IL); Omer Tripp, Bronx, NY (US); Omri Weisman, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/068,961

(22) Filed: Mar. 14, 2016

(65) Prior Publication Data

US 2016/0179960 A1  Jun. 23, 2016

Related U.S. Application Data

(63) Continuation of application No. 14/227,456, filed on Mar. 27, 2014.

(51) Int. Cl.
  *G06F 17/30* (2006.01)
  *G06F 17/22* (2006.01)
(52) U.S. Cl.
  CPC ..... *G06F 17/30864* (2013.01); *G06F 17/2235* (2013.01); *G06F 17/30958* (2013.01)
(58) Field of Classification Search
  CPC combination set(s) only.
  See application file for complete search history.

(56) References Cited

U.S. PATENT DOCUMENTS

| | | | |
|---|---|---|---|
| 8,347,272 | B2 | 1/2013 | Sugawara et al. |
| 8,887,037 | B1 | 11/2014 | Cook |
| 2007/0136318 | A1 | 6/2007 | Clark et al. |
| 2009/0138937 | A1 | 5/2009 | Erlingsson et al. |

(Continued)

FOREIGN PATENT DOCUMENTS

CA  2687672 A1  6/2011

OTHER PUBLICATIONS

Guha, Arjun et al , "Using Static Analysis for Ajax Intrusion Detection", International World Wide Web Conference, 2000, 10 pages located at http://cs.brown.edu/~sk/Publications/Papers/Published/gkj-stat-anal-ajax-id/paper.pdf.

(Continued)

*Primary Examiner* — Etienne Leroux
(74) *Attorney, Agent, or Firm* — Cantor Colburn LLP; Maeve Carpenter

(57) ABSTRACT

Crawling computer-based documents by performing static analysis on a computer-based document to identify within the computer-based document one or more execution vectors, where each execution vector includes a computer program segment including a call to an entity that is external to the computer-based document, and one or more additional computer program segments whose execution precedes and leads ultimately to execution of the computer program segment that includes the call to the entity, and causing any of the computer program segments in any of the execution vectors to be executed during a crawling of the computer-based document, and any computer program segment within the computer-based document that is excluded from the execution vectors to be excluded from execution during the crawling of the computer-based document.

1 Claim, 4 Drawing Sheets

(56) References Cited

U.S. PATENT DOCUMENTS

| | | |
|---|---|---|
| 2010/0257603 A1 | 10/2010 | Chander et al. |
| 2011/0314091 A1 | 12/2011 | Podjarny et al. |
| 2012/0078874 A1* | 3/2012 | Gonzalez .......... G06F 17/30864 707/709 |
| 2012/0310914 A1* | 12/2012 | Khan ................ G06F 17/30864 707/710 |
| 2013/0007885 A1 | 1/2013 | Haviv et al. |

OTHER PUBLICATIONS

Marino, Julio et al., (Abstract Only) "Using Static Analysis to Compile Non-sequential Functional Logic Programs*", Practical Aspects of Declarative Languages Lecture Notes in Computer Science, vol. 1753, 2000, 1 page.

* cited by examiner

OPTIMIZING WEB CRAWLING THROUGH WEB PAGE PRUNING

DOMESTIC PRIORITY

This application is a continuation of the legally related U.S. application Ser. No. 14/227,456 filed Mar. 27, 2014, which is fully incorporated herein by reference.

BACKGROUND

The present invention relates generally to computer-based data retrieval and analysis, and more particularly, to web crawling.

In order to automate the discovery of computer-based documents, software tools commonly known as "crawlers" have been developed to retrieve computer-based documents, such as Hypertext Markup Language (HTML) based web pages, and navigate from computer-based document to computer-based document along hyperlinks, such as Universal Resource Locators (URLs), embedded in the documents that indicate the locations of other documents. When a crawler retrieves a computer-based document, it typically parses the document text to identify strings that appear to be hyperlinks based on predefined character sequences, such as strings that begin with the characters "http://" or "ftp://". The crawler then retrieves computer-based document from the locations indicated by the identified hyperlinks, parses them, and so on. In this manner crawlers gather computer-based document content for later use, such as by search engines.

One of the challenges faced by crawlers is that some hyperlinks are not embedded as strings within computer-based documents, but rather are dynamically generated by computer program instructions found within the documents. For example, hyperlinks are often dynamically generated by Asynchronous JavaScript™ and XML (AJAX) instructions within a computer-based document that call entities, such as web servers, that are external to the document. As dynamically-generated hyperlinks are only generated when such instructions are executed, a crawler may employ an execution engine that executes such instructions within a computer-based document during crawling in order to discover any dynamically-generated hyperlinks that result from the execution. However, many of the computer program instructions within a computer-based document may be related to operations that do not yield dynamically-generated hyperlinks, such as rendering visual effects (e.g., highlighting a line of text on mouse hover), modifying content based on local reasoning (e.g., changing the order of items listed in a table), or performing client-side input validation (e.g., checking that an input box that is restricted to numeric values doesn't contain non-numeric characters). Thus, indiscriminate execution of the computer program instructions within a computer-based document during crawling is often wasteful and needlessly degrades the performance of the crawler.

SUMMARY

In one aspect of the invention a method is provided for crawling computer-based documents, the method including performing static analysis on a computer-based document to identify within the computer-based document one or more execution vectors, where each execution vector includes a computer program segment including a call to an entity that is external to the computer-based document, and one or more additional computer program segments whose execution precedes and leads ultimately to execution of the computer program segment that includes the call to the entity, and causing any of the computer program segments in any of the execution vectors to be executed during a crawling of the computer-based document, and any computer program segment within the computer-based document that is excluded from the execution vectors to be excluded from execution during the crawling of the computer-based document.

In other aspects of the invention systems and computer program products embodying the invention are provided.

BRIEF DESCRIPTION OF THE SEVERAL VIEWS OF THE DRAWINGS

The invention will be understood and appreciated more fully from the following detailed description taken in conjunction with the appended drawings in which.

DETAILED DESCRIPTION

Figure 1:
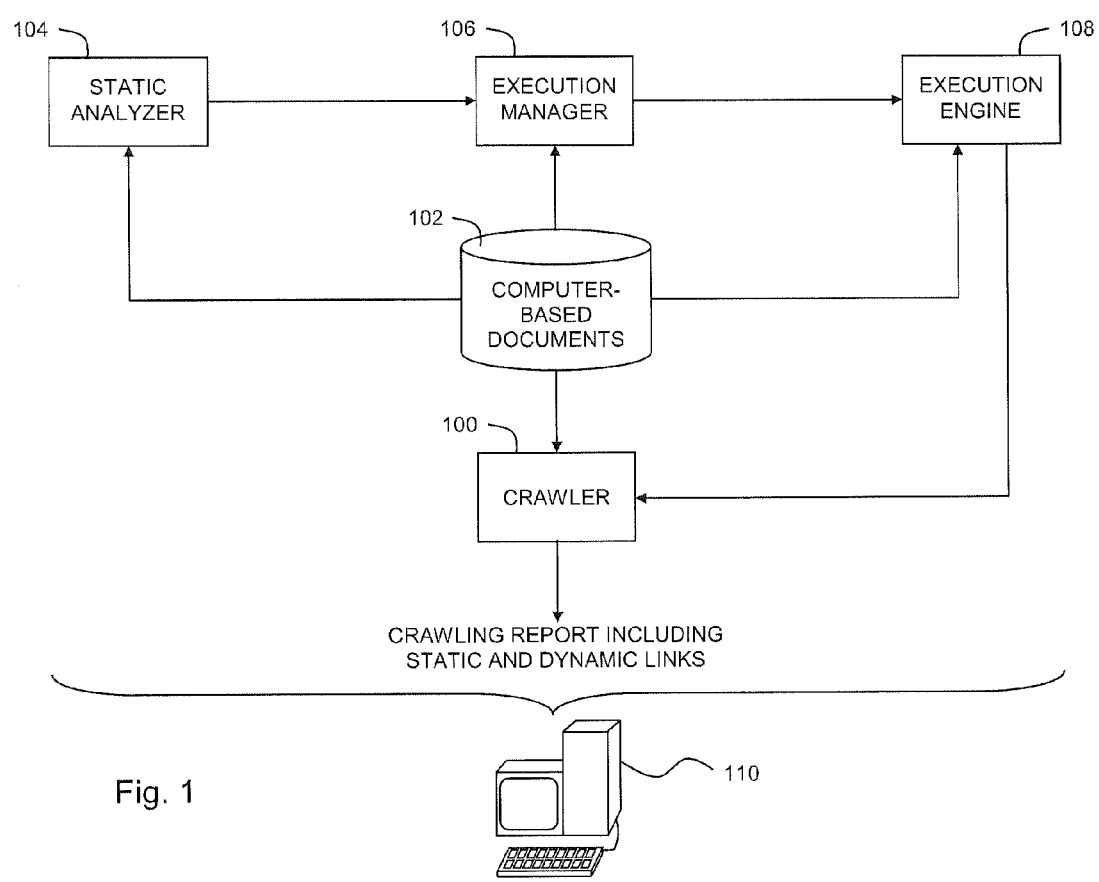
FIG. 1 is a simplified conceptual illustration of a crawling system, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a crawling system, constructed and operative in accordance with an embodiment of the invention. In the system of FIG. 1, a crawler 100 is configured to "crawl" computer-based documents 102, such as HTML-based web pages that are accessible via a computer network, such as the Internet, in accordance with conventional techniques, such as by: a) retrieving computer-based documents using one or more hyperlink "seeds" of Universal Resource Locators (URLs) provided to crawler 100, where each seed identifies the location of a computer-based document on a computer network, b) analyzing the retrieved documents to identify hyperlinks contained within the documents, c) retrieving computer-based documents using the identified hyperlinks, and d) repeating steps b) and c) until a predefined termination condition is reached, such as when a certain number of documents have been crawled or when a certain amount of time has elapsed since the crawling began.

Crawler 100 may also be configured to incorporate or cooperate with a static analyzer 104, an execution manager 106, and an execution engine 108 as described herein below.

Static analyzer 104 may be configured to perform static analysis on a computer-based document 102 to identify execution vectors within computer-based document 102, where each execution vector includes a computer program segment, such as a function, procedure, or instruction, that includes a call to an entity that is external to computer-based document 102, such as an asynchronous JavaScript™ and XML (AJAX) call to a computer server, and one or more additional computer program segments whose execution precedes and leads ultimately to execution of the computer program segment that includes the call to the entity.

Execution manager 106 may be configured to cause one or more of the computer program segments in one or more of the execution vectors identified by static analyzer 104 to be executed, such as by execution engine 108, during crawling of computer-based document 102 by crawler 100, while causing one or more of the computer program segments within computer-based document 102 that are excluded from the execution vectors to be excluded from execution by execution engine 108 during the crawling of computer-based document 102 by crawler 100. In an embodiment, execution manager 106 causes all of the computer program segments in all of the identified execution vectors to be executed by, or at least considered for execution by, execution engine 108 during the crawling of computer-based document 102 by crawler 100, such as by classifying the computer program segments in the identified execution vectors as being candidates for execution and providing this classification information for use by execution engine 108. Execution manager 106 may also cause all of the computer program segments within computer-based document 102 that are excluded from the execution vectors to be excluded from execution by execution engine 108 during the crawling of computer-based document 102 by crawler 100, such as by classifying any computer program segments excluded from the identified execution vectors as being subject to exclusion from execution and providing this classification information for use by execution engine 108.

Execution engine 108 may be configured to execute any computer program segments found within computer-based document 102 during the crawling of computer-based document 102 by crawler 100, and as described hereinabove by executing only those computer program segments that are within the execution vectors identified by static analyzer 104 while excluding from execution any computer program segments that are excluded from the identified execution vectors. Crawler 100 may be configured in accordance with conventional techniques to analyze the results of computer program segments executed by execution engine 108, such as to identify within the results any hyperlinks to other computer-based documents which may then themselves be crawled.

Any of the elements shown in FIG. 1 may be executed by or otherwise made accessible to a computer 110, such as by implementing any of the elements in computer hardware and/or in computer software embodied in a non-transitory, computer-readable medium in accordance with conventional techniques.

Figure 2:
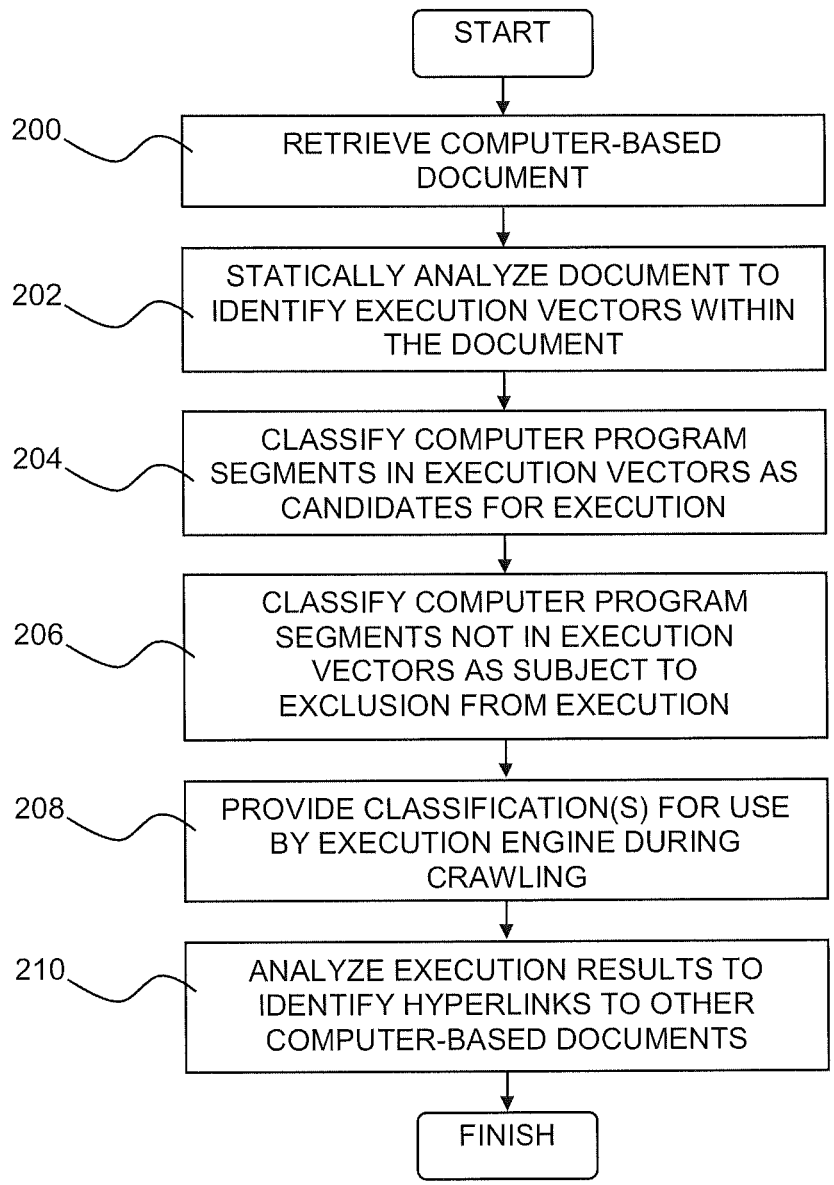
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2 a computer-based document is retrieved (step 200) and is statically analyzed to identify execution vectors within the computer-based document, where each execution vector includes a computer program segment that includes a call to an entity that is external to the computer-based document, as well as and one or more additional computer program segments whose execution precedes and leads ultimately to execution of the computer program segment that includes the call to the entity (step 202). Computer program segments that are included in identified execution vectors are classified as candidates for execution (step 204). Computer program segments that are not included in execution vectors are classified as subject to exclusion from execution (step 206). Either type of classification information is provided for use by an execution engine when the computer-based document is crawled (step 208). The results of executed computer program segments are analyzed to identify within the results any hyperlinks to other computer-based documents which may then themselves be crawled (step 210).

Figure 3:
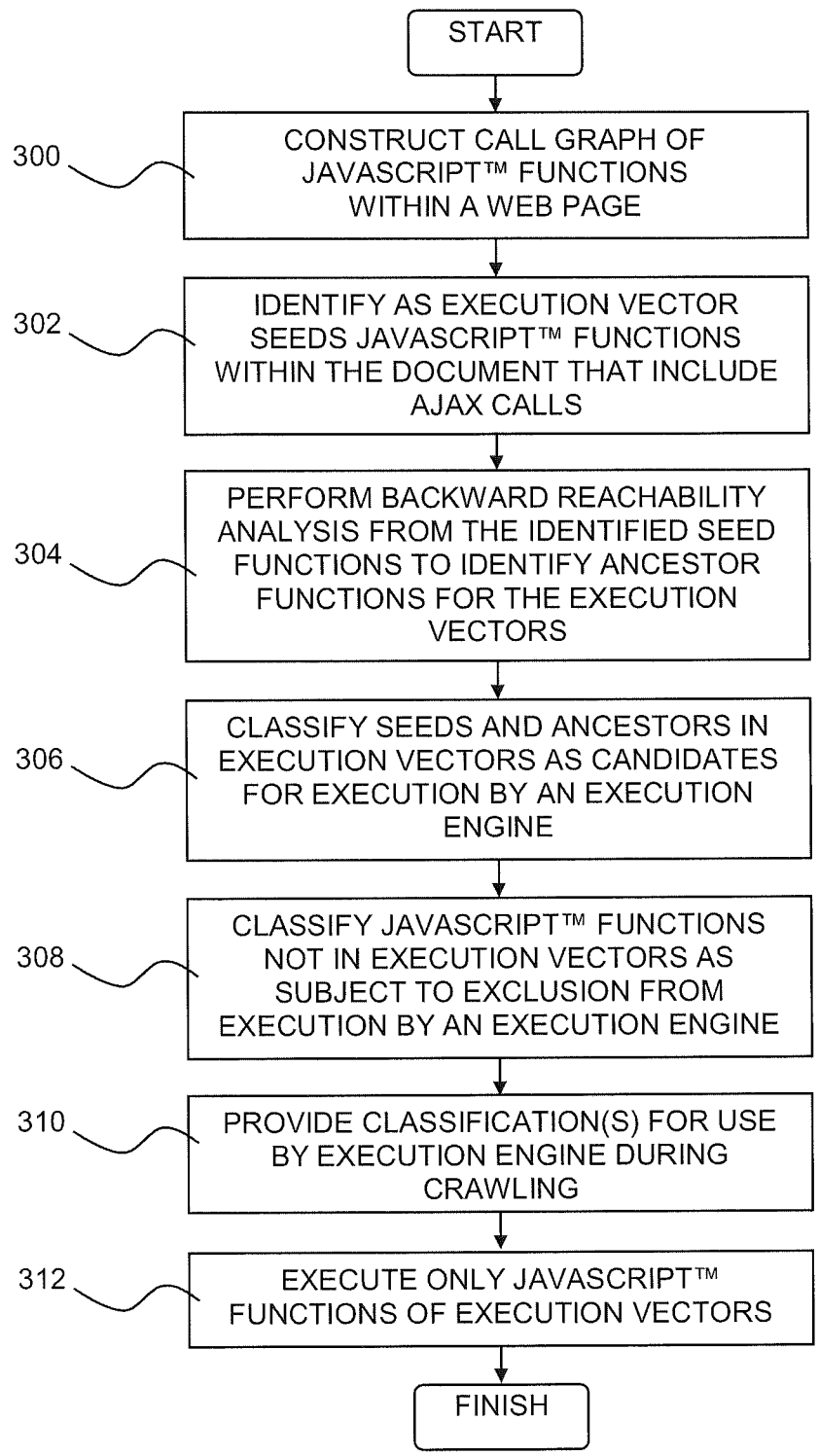
FIG. 3 is a simplified flowchart illustration of an exemplary method of operation of the system of FIG. 1 with respect to static analysis of a web page containing JavaScript™ programs that include AJAX calls, and the classification of JavaScript™ programs within the web page, operative in accordance with an embodiment of the invention.

Reference is now made to FIG. 3 which is a simplified flowchart illustration of an exemplary method of operation of the system of FIG. 1 with respect to static analysis of a web page containing JavaScript™ programs that include AJAX calls, and the classification of JavaScript™ programs within the web page, operative in accordance with an embodiment of the invention. In the method of FIG. 3 a call-graph representation of the JavaScript™ functions within the web page is constructed in accordance with conventional static analysis techniques (step 300). JavaScript™ functions that include AJAX calls are identified within the call graph (step 302). Backward reachability analysis is performed in accordance with conventional techniques, using the identified JavaScript™ functions that include AJAX calls as "seeds" for the backward reachability analysis, in order to identify within the call graph any "ancestor" JavaScript™ functions whose execution precedes and leads ultimately to execution of the identified seeds (step 304), where a seed and its ancestors together constitute an execution vector as defined herein. All identified seeds and their ancestors are classified as candidates for execution by an execution engine when the web page is crawled (step 306). After reaching a fixpoint during the backward reachability analysis, e.g., when all the ancestors of all the seeds have been identified, all JavaScript™ functions within the web page that have not been identified either as seeds or ancestors of seeds are classified as being subject to exclusion from execution by an execution engine when the web page is crawled (step 308). The classification information regarding the seeds and their ancestors, and/or the classification information regarding JavaScript™ functions within the web page that are subject to exclusion from execution, is then provided for use by an execution engine when the web page is crawled (step 310) whereupon the execution engine may execute only those JavaScript™ functions that belong to identified execution vectors (step 312).

Any of the elements described herein may be implemented in accordance with conventional techniques in computer software embodied in a non-transitory, computer-readable storage medium and/or in computer hardware.

Figure 4:
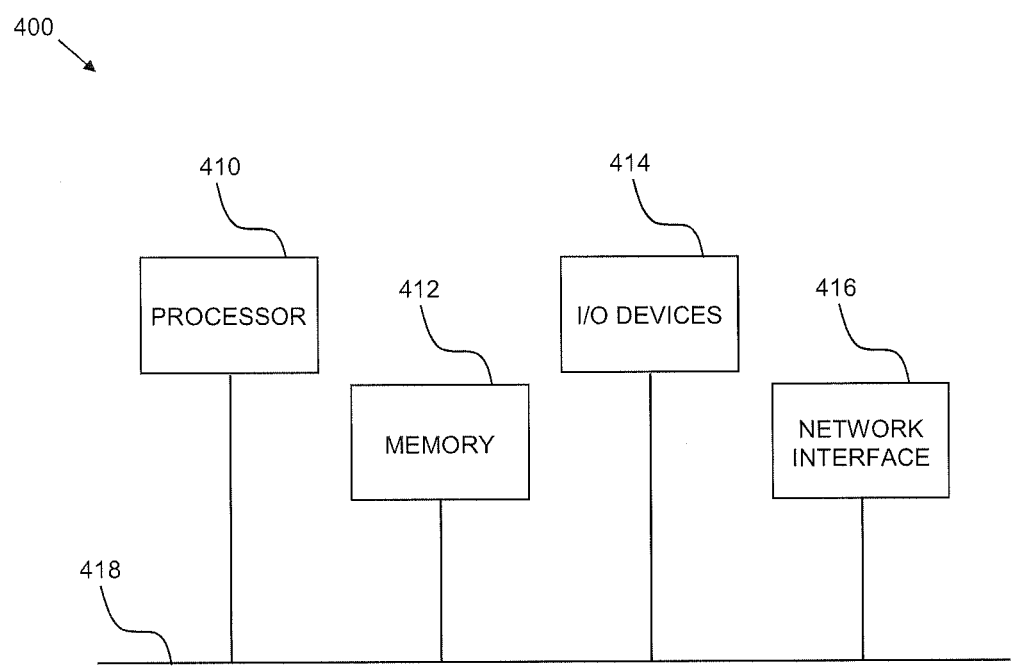
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3) may be implemented, according to an embodiment of the invention.

As shown, the techniques for controlling access to at least one resource may be implemented in accordance with a processor 410, a memory 412, I/O devices 414, and a network interface 416, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for crawling computer-based documents, the method comprising:
   performing static analysis on a computer-based document to identify within the computer-based document one or more execution vectors, wherein the performing static analysis comprises performing wherein any of the execution vectors includes an AJAX call to an entity that is external to the computer-based document,
   wherein each execution vector includes:
      a computer program segment including a call to an entity that is external to the computer-based document, and
      one or more additional computer program segments whose execution precedes and leads ultimately to execution of the computer program segment that includes the call to the entity;
   causing any of the computer program segments in any of the execution vectors to be executed during a crawling of the computer-based document, and any computer program segment within the computer-based document that is excluded from the execution vectors to be excluded from execution during the crawling of the computer-based document,
   wherein the causing comprises classifying for execution any of the computer program segments in any of the execution vectors;
   wherein the causing comprises classifying as excluded from execution any computer program segment within the computer-based document that is excluded from the execution vectors; and
   identifying a hyperlink resulting from the execution of any of the computer program segments in any of the execution vectors.

* * * * *